March 15, 1927.
W. A. COLLINS
1,621,396
THERMO ELECTRIC INDICATOR AND SAFETY DEVICE
Filed April 19, 1923   2 Sheets-Sheet 1
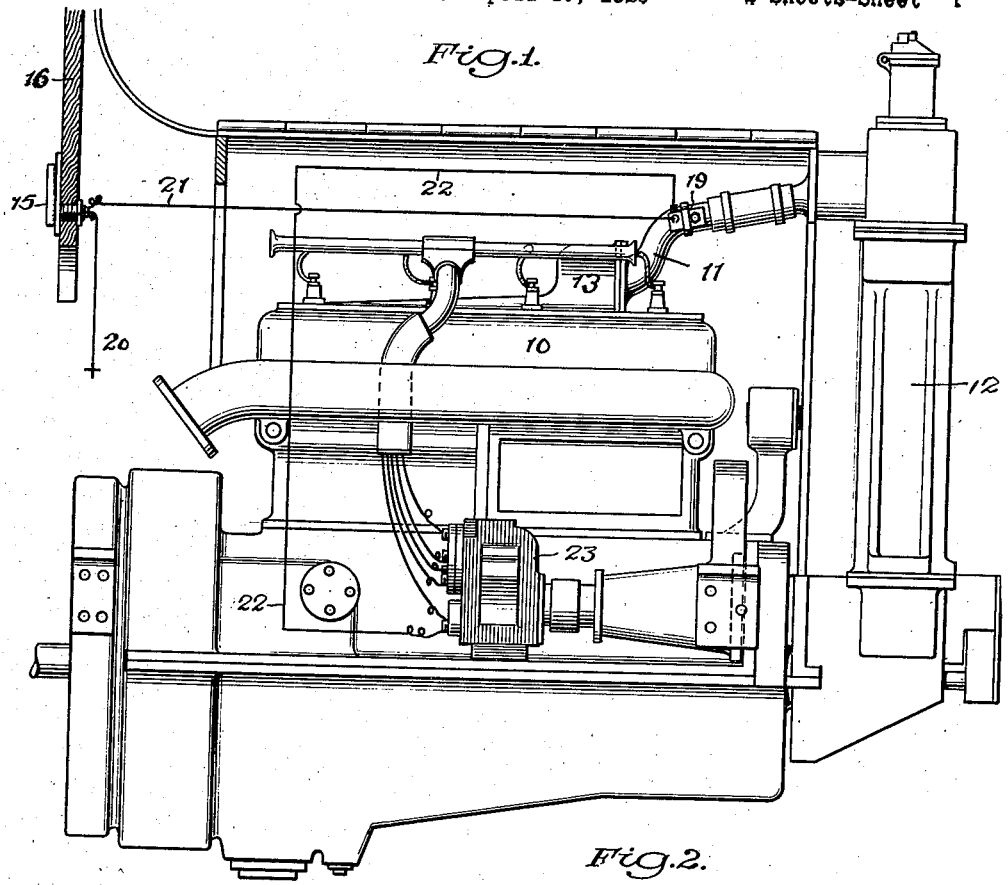
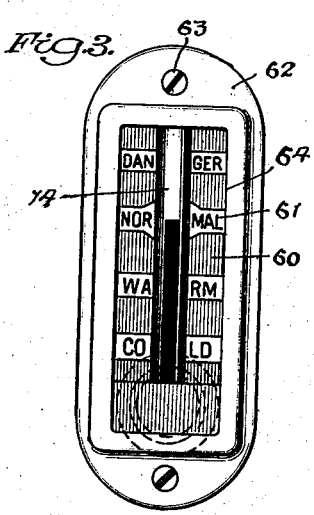
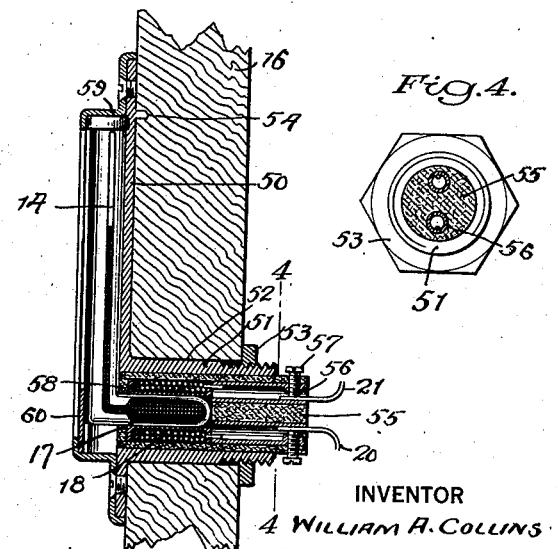
INVENTOR
WILLIAM A. COLLINS
BY
ATTORNEYS March 15, 1927.
W. A. COLLINS
1,621,396
THERMO ELECTRIC INDICATOR AND SAFETY DEVICE
Filed April 19, 1923 2 Sheets-Sheet 2
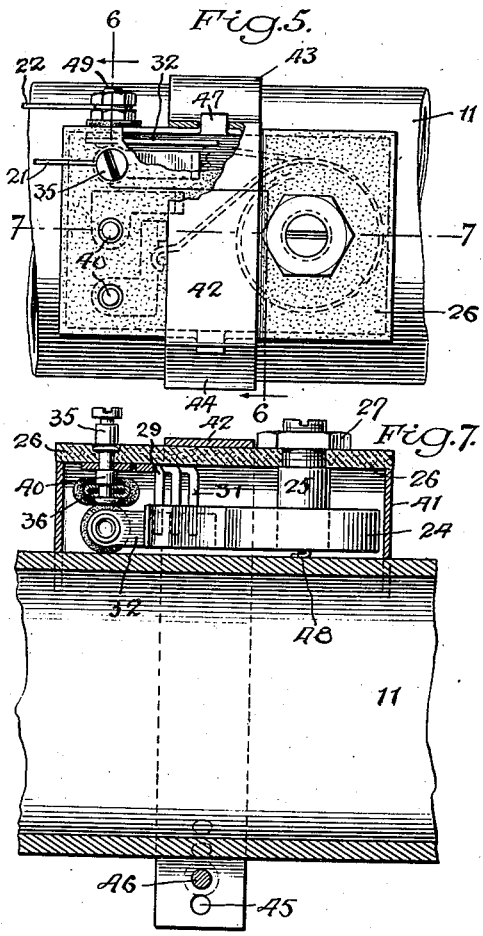
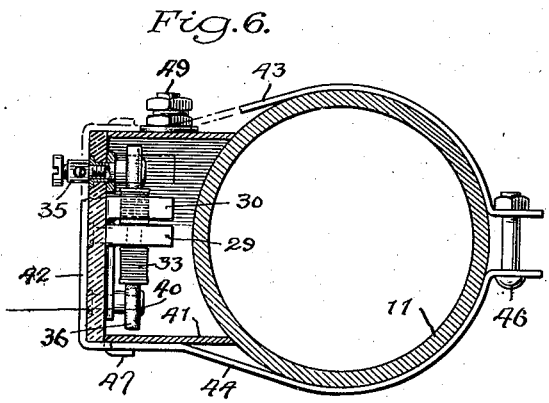
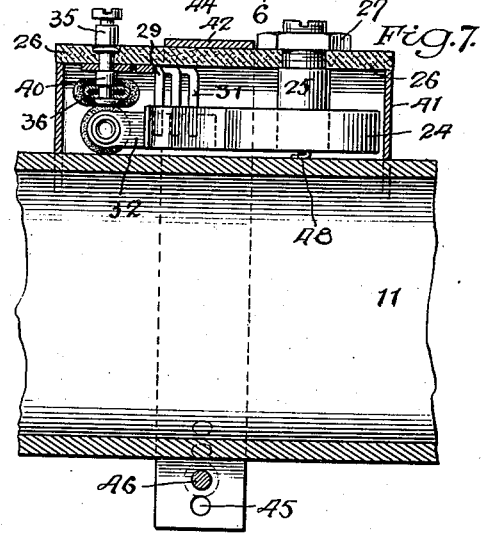
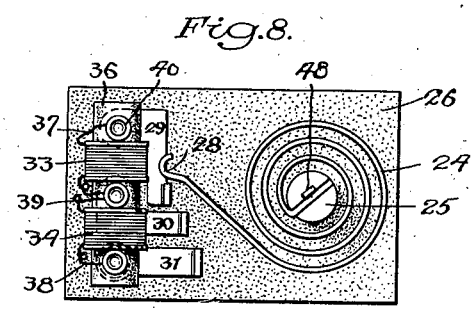
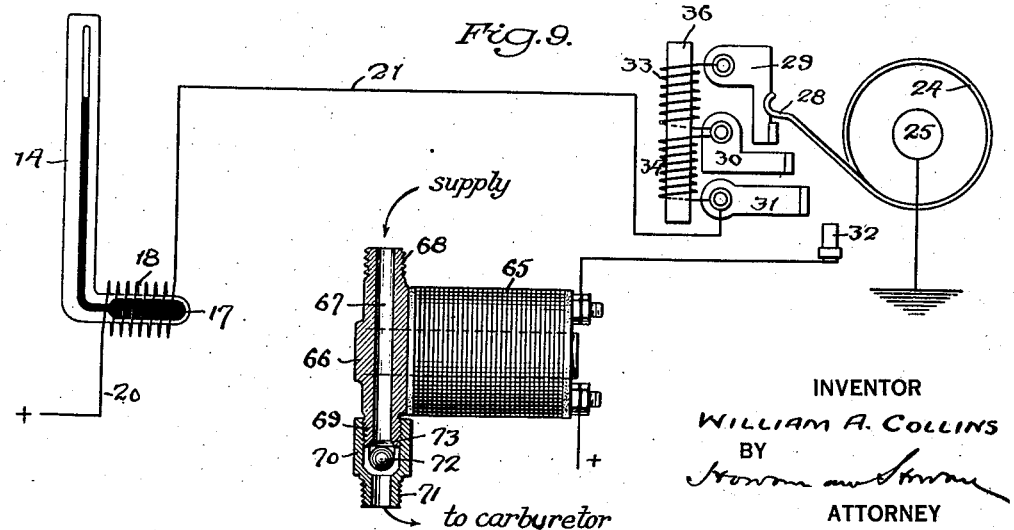
INVENTOR
WILLIAM A. COLLINS
BY
ATTORNEY Patented Mar. 15, 1927.

1,621,396

UNITED STATES PATENT OFFICE.

WILLIAM A. COLLINS, OF PHILADELPHIA, PENNSYLVANIA, ASSIGNOR, BY MESNE ASSIGNMENTS, TO THE SAFE-T-STAT CO., OF PHILADELPHIA, PENNSYLVANIA, A CORPORATION OF DELAWARE.

THERMO-ELECTRIC INDICATOR AND SAFETY DEVICE.

Application filed April 19, 1923. Serial No. 633,315.

My invention relates to an improved temperature indicator and safety device. While specifically applicable to explosion engines, its utility is not limited to this type of installation.

Among the objects of my invention may be specified first, the provision of a temperature indicator actuated by an electrical heating resistance, the circuit of which is governed by a thermostat subject to temperature fluctuations; second, the provision of means also governed by the thermostat for controlling the source of temperature fluctuations; third, various details of specific construction and application hereinafter described or shown in the accompanying drawings, in which—

Fig. 1 is a more or less diagrammatic side elevation of an explosion engine to which my invention is applied in one form;

Fig. 2 is a vertical section, on a larger scale, through the indicator;

Fig. 3 is a front elevation of the latter;

Fig. 4 is a section on the line 4—4, Fig. 2;

Fig. 5 is a broken plan view of the thermostatic element and its mounting;

Figs. 6 and 7 are, respectively, sections on the lines 6—6 and 7—7, Fig. 5;

Fig. 8 is an inverted plan of the thermostatic element detached; and

Fig. 9 is a diagrammatic scheme of the layout, illustrating, however, a different type of engine cut-out from that shown in Fig. 1.

As above stated, the present invention is more broadly applicable than to an explosion engine. It is therefore only to illustrate the invention and one practical application thereof, that I have shown it associated with an explosion engine of usual type for automobiles.

Referring to Fig. 1, the explosion engine 10, of any appropriate jacketed type, is provided with an outlet pipe 11 for the temperature exchange fluid, which will for convenience be called water, leading to the radiator 12. The pipe is connected to the dome 13, at which point the water is at its highest temperature and passes thence immediately through the pipe 11 to the radiator for cooling. As is well known, the engine functions to best advantage when quite warm, but disadvantageous conditions occur if its temperature rises above a certain point. Inasmuch as the engine temperature is reflected by the temperature of the water, an indication of the latter affords a safe indication of engine conditions.

To obtain such indication I provide a thermometer 14, preferably of the spirit type, mounted in a suitable casing 15 on the dash 16 of the car at a point readily visible to the operator. To actuate the thermometer, its bulb 17 is surrounded by a resistance coil 18, the current flowing through which is controlled by a thermostatic switch, generally indicated in Fig. 1 by the reference 19, and the circuit being established from any suitable source 20 through the resistance coil 18 and lead 21 to the switch 19 and thence to ground. It may be briefly stated that by means hereinafter described, the thermostatic switch controls the current passing through the heating coil 18 in such fashion that as the temperature of the water in the engine jacket rises, more current flows through the coil 18 and the bulb 17 of the thermometer is heated with consequent indication of temperature by the rise of the liquid in the stem of the thermometer.

The second phase of the invention—viz the thermostatic control of the source of temperature fluctuations—(i. e., the engine, in this case) is also generally indicated in Fig. 1. To this end, the thermostatic switch has connected thereto, a lead 22 to the spark circuit of the engine—for instance, to the magneto 23. When the thermostat has been sufficiently distorted by the heat of the water from the engine jacket, this circuit is closed and the magneto grounded, thus cutting out the sparking system and halting the engine until the water has cooled sufficiently to again open the ground connection.

Turning to the details of construction, the thermostat is shown on a large scale in Fig. 5—8 inclusive. It comprises a bi-metal spiral 24 carried by a central mounting screw 25. The latter is shouldered to bear against the insulating base 26, through which its threaded end passes for engagement by the clamping nut 27. The outer free end of the spiral forms a brush 28, which, on the distortion of the thermostat by heat, successively wipes the switch contacts 29, 30 and 31 in the circuit of the heating coil 18, and eventually engages the grounding contact 32 of the magneto 23. Interposed between switch contacts 29 and 30 is a resistance 33, while between contacts 30 and 31 is a second resistance 34. The lead 21 from the heating coil 18 is connected to the binding post 35 associated with switch contact 31, so that when the brush 28, following initial distortion of the thermostat, engages contact 29, the current flow to the heating coil 18 is cut down by both resistances 33 and 34 in series. When the brush engages contact 30, the resistance 33 is cut out and more current passes to the heating coil—sufficient to cause the indicating spirit to rise to the level of the legend " Normal." When the engine becomes overheated, the thermostat brush engages contact 31, cutting out both resistances 33 and 34, thus permitting the flow of full current to the heating coil 18 and causing a rise of the indicator spirit to the level of the legend " Danger." If this warning is not heeded, and the engine is continued in operation, until the heat of the water in its jacket causes the thermostat brush 28 to engage contact 32, the magneto is short-circuited— and the engine automatically stopped by the cessation of the ignition spark.

A convenient mounting of the resistances 33 and 34 is indicated. The resistance wire is wound on independent flattened cardboard spools, which are passed over a bar 36 of fiber insulation. The ends 37 and 38 of the resistance wire, as well as the intermediate loop 39 between the spools, are clamped by the spun-over rivet heads of bushings 40 carried by the bar 36. The bushings are also shouldered to engage the bases of the contact plates 29, 30 and 31 and pass therethrough and through the base 26, and their outer ends spun over to hold the parts in position. One of the bushings is tapped to receive the binding screw terminal 35 exposed on the outer face of the base 26.

The base 26 is spaced from the engine jacket outlet pipe 11 by a metal casing 41 open toward the pipe 11 and with its end walls shaped to the contour of the latter. It is clamped against the pipe by a strap metal yoke 42, the arms 43 and 44 of which embrace the pipe and are provided adjacent their free ends with series of apertures 45 to receive a draw-up bolt 46—and by which the appliance may be secured to pipes of different diameters. The yoke is secured to the casing by lugs 47 struck out from the casing side walls and passing through appropriate openings in the arms 43 and 44 of the yoke. This construction also serves to hold the base 26 and casing assembled prior to mounting on the pipe 11. In mounted position, the inner end of the thermostat post 25, or a contact lug 48 thereon, is pressed against the pipe 11 and affords the grounding connection for the circuit through the switch. The magneto cut-out contact 32 is mounted on, but insulated from, the casing wall 41. It may, for example, be clamped beneath the head of the binding post 49 which is spaced by appropriate insulating bushings and washers from the wall of casing 41, and to which the magneto lead 22 is connected.

The indicator construction is shown on a larger scale in Figs. 2, 3 and 4. It comprises a base plate 50 having at its lower end a tubular boss 51 adapted to pass through a hole 52 cut in the dash 16 and threaded to receive a clamping nut 53. A short pin 54 projecting from the plate enters the dash and holds the mount against rotation. Within the boss 51 is arranged an insulating plug 55, preferably of fiber or the like, recessed at one end to receive the heating coil 18 and having independent passages extending to its opposite end to receive the connector terminals 56 to which the opposite ends of the coil are respectively soldered. Set screws 57 passing through the walls of the plug and of the connectors, serve not only to hold the latter in position on the plug, but also to secure the ends of the leads 20 and 21. The offset bulb end 17 of the thermometer is accommodated within the coil 18 and is supported and positioned by means of a washer 58 fitting within the end of the plug 55. A clip 59 grips the upper end of the thermometer stem. It will be noted that the bulb 17 is practically enclosed within the plug chamber which accommodates the heating coil 18, and that the heat of the latter is thus effectively confined and transmitted to the liquid in the bulb.

Facing the stem of the thermometer is the legend carrier 60, centrally apertured to permit inspection of the stem and the rise of the liquid level with respect to the legends 61. The cover plate and guard 62 is secured by screws 63 to the base plate 50 and confines and supports the legend carrier, which is visible through the opening 64 therein.

In its main features the modification illustrated in Fig. 9 is the same as that above described. Instead of grounding the magneto through the thermostat, however, the device serves to cut off the fuel supply under the same conditions. Thus, when the brush 28, on overheating of the thermostat, engages contact 32, a circuit is closed through an electromagnet 65. The coil is wound on a soft iron core, the head 66 of which is pressed to form a passageway 67. It is threaded at one end 68 to form a nipple for attachment in the fuel supply line—(e. g., just below the vacuum tank) and at its other end 69 to form a nipple on which screws a brass valve chamber 70—in turn threaded at 71 for the pipe connection to the carburetor. A steel ball 72 arranged in the valve chamber normally occupies an open valve position. When the coil is energized, however, the ball is attracted to its seat 73 and closes the passage 67, thus cutting off the flow of fuel to the carburetor so long as the coil 65 remains energized. This construction has a certain advantage over the construction first described, in that a motor the cylinders of which are carbonized, is not effectively stopped by cutting out the ignition, since the red hot carbon in the cylinders ignites the charge. If the supply of fuel is cut off, however,—as by the present arrangement,—this possibility is obviated.

It will be observed that the only mutilation of the car which is necessary for the installation of the present apparatus in either form, is the cutting of the hole 52 for the accommodation of the thermometer support. The installation may be readily effected, occupies little room, and necessitates no alteration of existing equipment. It is self-contained and applicable to practically all makes of car. It is effective in service and reliable.

Modifications in detail of construction will readily occur to those skilled in the art which do not depart from what I claim as my invention. Moreover, the adaptation of the underlying thoughts, not only to other types of explosion engines, but also to other types of temperature indication and control—e. g., refrigerators—is within the scope of what I claim as my invention.

I claim—

1. In a temperature indicator, the combination with a visible indicator element consisting of a liquid column thermometer, of a heating resistance placed in proximity thereto to affect the liquid column, an electric circuit including said resistance, and a thermostatic rheostat controlling the current in said circuit.

2. In a temperature indicator, the combination with a visible indicator element consisting of a liquid column thermometer, of a heating resistance placed in proximity thereto to affect the liquid column, and electric circuit including said heating resistance together with a plurality of additional resistance units, and a thermostatic switch arm adapted with increasing temperature to progressively cut said units out of circuit.

3. The combination with an internal combustion engine, of a rheostat including means controlled by the temperature of the engine, a heating resistance, an electric circuit including said resistance and said rheostat, and a visible indicator consisting of a liquid column thermometer placed in proximity to and to be affected by said resistance.

4. The combination with an internal combustion engine, of an electric circuit including a rheostat and a heating resistance, thermostatic means for operating the rheostat in accordance with the engine temperature whereby as the said temperature increases rheostat resistance is progressively cut out of the circuit, and a visible indicator consisting of a liquid column thermometer placed in proximity to and to be affected by said heating resistance.

In testimony whereof I have signed my name to this specification.

WILLIAM A. COLLINS.